(12) United States Patent
Luo et al.

(10) Patent No.: US 7,382,907 B2
(45) Date of Patent: Jun. 3, 2008

(54) SEGMENTING OCCLUDED ANATOMICAL STRUCTURES IN MEDICAL IMAGES

(75) Inventors: Jiebo Luo, Pittsford, NY (US); Amit Singhal, Scottsville, NY (US)

(73) Assignee: Carestream Health, Inc., Rochester, NY (US)

( * ) Notice: Subject to any disclaimer, the term of this patent is extended or adjusted under 35 U.S.C. 154(b) by 690 days.

(21) Appl. No.: 10/994,714

(22) Filed: Nov. 22, 2004

(65) Prior Publication Data

US 2006/0122480 A1     Jun. 8, 2006

(51) Int. Cl.
*G06K 9/00* (2006.01)
(52) U.S. Cl. .................. 382/128; 382/171; 382/173
(58) Field of Classification Search ........ 382/128, 382/129, 130, 131, 132, 133, 134, 164, 171, 382/173, 177, 179; 600/31, 141, 443, 449, 600/491, 492, 494, 495, 499, 516, 587; 604/34, 604/41, 96.01, 215, 260, 907; 606/157
See application file for complete search history.

(56) References Cited

U.S. PATENT DOCUMENTS

| 5,072,384 | A | * | 12/1991 | Doi et al. ................ 382/132 |
| 6,246,784 | B1 | * | 6/2001 | Summers et al. ........... 382/128 |
| 6,985,612 | B2 | * | 1/2006 | Hahn ..................... 382/128 |
| 2004/0153128 | A1 | | 8/2004 | Suresh et al. |

OTHER PUBLICATIONS

Daniel Cremers et al., Shape Statistics in Kernel Space for Variational Image Segmentation, Pattern Recognition 36 (2003) pp. 1929-1943.

Burgener et al., Differential Diagnosis in Conventional Radiology, pp. 259-292 (1985).

C. Saul Danzer, The Cardiothoracic Ratio: An Index of Cardiac Enlargement, Amer. J. Med. Sci., vol. 157, No. 4, pp. 513-524, (1919).

T.F. Cootes et al., Active Shape Models—Their Training and Application, Computer Vision and Image Understanding, vol. 61, No. 1, (1995) pp. 38-59.

Bram van Ginneken et al., Active Shape Model Segmentation With Optimal Features, IEEE Transactions on Medical Imaging, vol. 21, No. 8, (2002), pp. 924-933.

J. Lawrence Paul et al., The Measurement of Total Lung Capacity Based on a Computer Analysis of Anterior and Lateral Radiographic Chest Images, IEEE Transactions on Biomedical Engineering, vol. BME021, No. 6, (1974), pp. 444-451.

Nobuhiko Sezaki et al., Automatic Computation of the Cardiothoracic Ratio With Application to Mass Screening, IEEE Transactions on Biomedical Engineering, vol. BME-20, No. 4, (1973), pp. 248-253.

(Continued)

Primary Examiner—Abolfazl Tabatabai

(57) ABSTRACT

A method for segmenting an anatomical structure having portions occluded in a digital image wherein the digital image is produced by a projection-based medical imaging modality. The method includes the steps of: outlining an unoccluded portion of the anatomical structure in a training image; augmenting the occluded portion of the anatomical structure according to a pre-determined atlas of the anatomical structure; generating an augmented training example using the outlined and augmented portions; repeating the steps of outlining, augmenting, and generating for a plurality of training images to train a statistical model of the structure; accessing the digital image; and segmenting the anatomical structure in the accessed digital image according to the statistical model.

8 Claims, 7 Drawing Sheets

OTHER PUBLICATIONS

Richard P. Kruger et al., Automated Radiographic Diagnosis Via Feature Extraction and Classification of Cardiac Size and Shape Descriptors, IEEE Transactions on Biomedical Engineering, vol. BME-19, No. 3, (1972) pp. 174-186.

D.L. Hall et al., Direct Computer Diagnosis of Rheumatic Heart Disease, Diagnostic Radiology, Radiology 101, pp. 497-509, (1971).

H.C. Becker et al., Digital Computer Determination of a Medical Diagnostic Index Directly From Chest X-Ray Images, IEEE Transactions on Biomedical Engineering, (1964) pp. 67-72.

Phillip H. Meyers et al., Automated Computer Analysis of Radiographic Images, Radiology 101, vol. 83, (1964), pp. 1029-1034.

Daivd Sutton, A Textbook of Radiology and Imaging, vol. 1, 4th Edition, 1987, pp. 554-556.

* cited by examiner

SEGMENTING OCCLUDED ANATOMICAL STRUCTURES IN MEDICAL IMAGES

FIELD OF THE INVENTION

The invention relates to digital image processing, and more particularly, to segmenting anatomical structures in medical images. More specifically, the present invention relates to a method for segmenting occluded anatomical structures in images from projection-based medical imaging.

BACKGROUND OF THE INVENTION

Cardiac size is useful diagnostic information obtained from chest radiographs. Abnormal enlargement of the heart is often detected initially in reviews of these images. A conventional method of assessing cardiac enlargement is by measurement of the cardiothoracic ratio (CTR) (see to Sutton, "A Textbook of Radiology and Imaging," 4th Edition, Vol. 1, pp. 554-556 Churchill Livington, 1987; and Burgener et al., "Differential Diagnosis in Conventional Radiology," pp. 259-292 (George Thieme Verlag, Thieme-Stratton, 1985) which is a ratio of the transverse diameter of the cardiac shadow to the transverse diameter of the thorax at the highest level of the diaphragm (refer to Danzer, "The Cardiothoracic Ratio An Index of Cardiac Enlargement," Am. J. Med. Sci. 157:513-524, 1919).

The concept of automated computer analysis of radiographic images dates back to the 1960's. An early attempt at automated determination of the CTR was that of Meyers et al. (Radiology 83:1029-1033 1964) wherein the spatial signature from digitized chest images was used and the edges of the heart and lung was determined from the first derivative of the signature. (See also Becker et al., IEEE Trans. Biomed. Eng. BME-11:67-72, 1964.) Hall et al. (Radiology 101:497-509, 1971) and Kruger et al. (IEEE Trans. Biomed. Eng. BME-19:174-186, 1972) developed an algorithm for automated diagnosis of rheumatic heart disease, wherein the CTR and other cardiac parameters were computed. The approach included determining a cardiac rectangle from analysis of the signatures and their derivatives, and then estimating the cardiac shadow by thresholding the image on the basis of analysis of the histogram.

Sezaki et al. (IEEE Trans. Biomed. Eng. BME-20:248-253, 1973) developed an algorithm with which the CTR was computed for about 1 sec to provide radiologists with a practical instrument with which patients with abnormal hearts could be detected automatically by analysis of mass-screening chest radiographs.

Paul et al. (IEEE Trans. Biomed. Eng. BME-21:441-451, 1974) computed the total lung volume by analyzing AP and lateral chest images, in which they determined the cardiac boundary by using the Gaussian-weighted derivative edge detection technique.

US Patent Application No. 2004/0153128 (Suresh el al) is directed to method and system for image processing and contour assessment. One embodiment relates to a computerized method of facilitating cardiac intervention.

U.S. Pat. No. 5,072,384 (Doi et al.) relates to a method and system for automated computerized analysis of sizes of hearts and lungs in digital chest radiographs, comprising: (1) detecting plural right and left cardiac boundary points in the cardiac contour; (2) fitting a predetermined model function to the detected cardiac boundary points to derive a completed cardiac contour based on the fitted model function; (3) using a shift-variant sinusoidal function as said predetermined model function; and (4) producing a representation of the completed cardiac contour. Specifically, after extracting edge points based on edge gradients, Doi performs the following operations: (1) selecting plural of those possible cardiac boundary points, which are adjacent said diaphragm edge points as cardiac boundary points; (2) fitting said selected cardiac boundary points to a predetermined model function in the form of a circle using a least squares method to derive a first circle fitted to said selected boundary points; (3) selecting second and third circles concentric with said first circle and respectively having diameters larger and smaller by a predetermined amount than the diameter of said first circle; (4) detecting which of the possible cardiac boundary points are located in a region between said second and third circles; and (4) selecting those possible cardiac boundary points detected as being located in the region between said second and third circles as cardiac boundary points. Doi measures the size of the cardiac contour fitted to the cardiac boundary points. DOI also describes the use of a shift-variant sinusoidal function as the model function fitted to the right and left cardiac boundary points determined from the digital chest radiograph.

However, while the human heart has a somewhat constant shape, Doi's parametric models (e.g., circle, or cosine functions) are over-simplified and over-constrained so that they are frequently inadequate to handle the amount of shape variations between different individuals, between different periods of the heartbeat cycle, and between different amounts of occlusion.

Recently, a statistical model referred to as an active shape model (ASM) has been applied to segmentation of lung fields in digital radiographs. ASM is described in Ginneken et al. (B. V. Ginneken, A. F. Frangi, J. J. Staal, B. M. H. Romeny, and M. A. Viergever, "Active shape model segmentation with optimal features," IEEE Trans. on Medical Imaging, vol. 21, no. 8, August 2002.).

A difference between lung fields and the heart is that the lung fields are completely un-occluded in a chest radiograph, while the heart is severely occluded. It is estimated that, on average, 20-40% of the heart boundary is visible because of the mediastinum, which is in front of the heart in PA exams (posterior-anterior) or behind the heart in AP (anterior-posterior) exams. Because x-ray imaging is a projection-based imaging modality (compared to cross section-based imaging modalities such as CT and MRI), the heart appears as an occluded object in a radiograph regardless of whether it is a PA or AP exam. Consequently, ASM is not directly applicable for a severely occluded object such as the heart.

Accordingly, there exists a need for a method for segmenting occluded anatomic structures in a medical image produced by a projection-based medical imaging modality.

Further, there exists a need for a statistical model for such structures in order to handle large statistical variations in the shape of the target structure due to various factors.

SUMMARY OF THE INVENTION

An object of the present invention is to provide a method for segmenting occluded anatomic structures in a medical image produced by a projection-based medical imaging modality.

Another object of the present invention is to provide a statistical model for such structures in order to handle large statistical variations in the shape of the target structure due to various factors.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

According to one aspect of the invention, there is provided a method for segmenting an anatomical structure having portions occluded in a digital image wherein the digital image is produced by a projection-based medical imaging modality. The method includes the steps of: outlining an unoccluded portion of the anatomical structure in a training image; augmenting the occluded portion of the anatomical structure according to a pre-determined atlas of the anatomical structure; generating an augmented training example using the outlined and augmented portions; repeating the steps of outlining, augmenting, and generating for a plurality of training images to train a statistical model of the structure; accessing the digital image; and segmenting the anatomical structure in the accessed digital image according to the statistical model.

It is an advantageous effect of the invention that an improved object segmentation method is provided, in which segmentation is automatic and is insensitive to occlusion and shape variation.

It is a further advantageous effect of the invention to provide a fully automated segmentation method.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

DETAILED DESCRIPTION OF THE INVENTION

Figure 1:
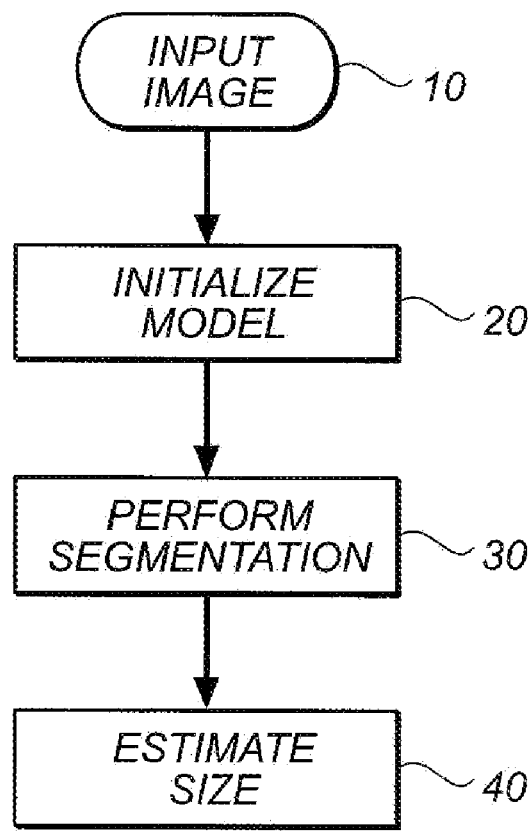
FIG. 1 is a block diagram illustrating the steps of an embodiment of a method in accordance with the present invention.

The following is a detailed description of the preferred embodiments of the invention, reference being made to the drawings in which the same reference numerals identify the same elements of structure in each of the several figures.

Some portions of the detailed descriptions which follow are presented in terms of algorithms and symbolic representations of operations on data bits within a computer memory. These algorithmic descriptions and representations are used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. For convenience, these signals as sometimes referred to herein in relation to the underlying information using references such as bits, values, elements, symbols, characters, terms, numbers, or the like.

It should be noted, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar data processing device, that manipulates and transforms data represented as physical (e.g. electronic) quantities within the computer system's registers and memories into other data similarly represented as physical quantities within the computer system memories or registers or other such information storage, transmission or display devices.

The present invention also relates to systems including specific pieces of apparatus for performing the operations described herein. Apparatus such as a programmable computer may be specially constructed for the required purposes, or may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic- optical disks, read-only memories (ROMs), random access memories (RAMs) such as Dynamic RAM (DRAM), EPROMs, EEPROMs, magnetic or optical cards, or any type of media suitable for storing electronic instructions, and each of the above storage components is coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the methods. The structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); and the like.

References to "in a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The invention is thus inclusive of combinations of the embodiments described herein.

FIG. 1 shows a block diagram illustrating the steps of an embodiment of a method in accordance with the present invention. An input image (step 10) is accessed and/or obtained through a projection-based medical imaging modality, such as an x-ray modality.

At step 20, a statistical model of the interested anatomical structure is initialized in terms of a rough size and location of the structure, using manual operations or according to automatically located reference objects in the vicinity.

Segmentation is performed (step 30) by optimizing a match of the statistical model against an actual image characteristics in the input image.

Then, if needed, a size of the anatomical structure can be estimated (step 40) according to the segmented contour of the anatomical structure.

Figure 2B:
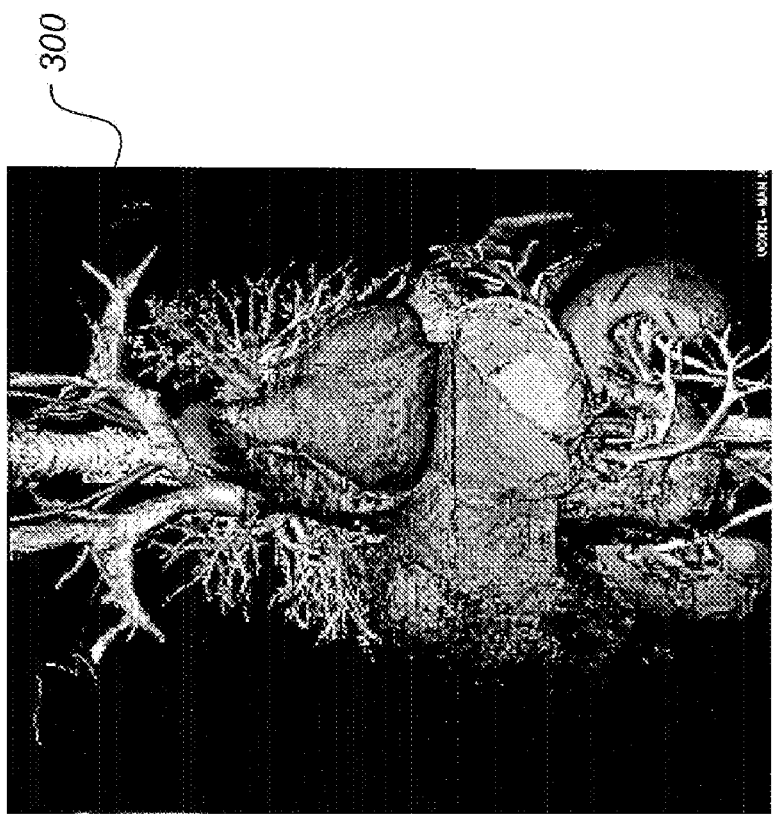
FIGS. 2A and 2B are a diagrammatical illustration of augmenting a training example.
Figure 2A:
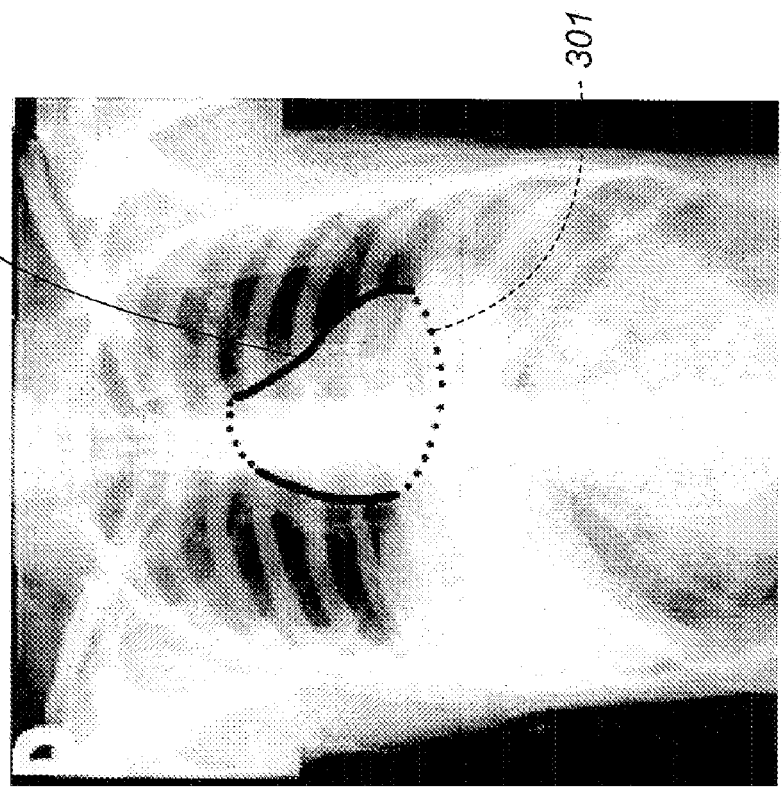

FIG. 2A and 2B show a diagrammatical illustration of augmenting a training example. That is, these figures illustrate how to augment a training example.

As described above, often the heart boundary is occluded, as indicated by the broken lines in FIG. 2A. According to the present invention, additional nodes need to be placed along occluded portions (broken lines, 301) of the target boundary based on the visible portions (solid lines, 302) and a predetermined anatomy atlas (300). Ideally, the occluded portion should be filled if the actual anatomy is available and registered, as shown in FIG. 2A. However, this is not practical. Rather, in practice, this is performed by an experienced operator who understands the anatomy and is able to extrapolate from the visible portions based on his knowledge of the anatomy. This augmenting process is repeated for a plurality of training examples to facilitate the derivation of a statistical model for the anatomical structure. The training images marked and augmented by the operator form a set of augmented training images.

In view of the complicated subject matter, heart shapes with severe occlusion, active shape model segmentation procedures are preferred. Active shape models (ASMs) can take into account both the shape and structure (i.e., "texture") of an object through statistical learning of the variation in the shape and texture of the class of modeled objects. Consequently, a properly trained ASM is robust to noise, geometric distortion, and color variation.

It is noted that, in comparison, a parametric shape model, such as the circle used by Doi, is inadequate to accurately model the variations in individual heart shapes, which are complicated by the distortions over the systolic and diastolic cycles of heartbeat. This is because such a parametric model is oversimplified and over-constrained.

Details about the active shape model is disclosed in "Active Shape Models—Their Training and Application," Cootes et al., Computer Vision and Image Understanding, Vol. 61, No. 1, pp. 38-59, (1995). The active shape model technique described in the Cootes et al. article determines the locations of feature points by performing a series of local searches for positions with matching textural appearance, with constraining of the results based on a global model of plausible shapes. Texture and shape models are integrated. This can be a convenient feature for dental imaging.

A texture model is constructed for every feature point. Gradient profiles are calculated for the image intensity signal within a specified window. The major axis of this window is oriented normal to the connections between feature points. The gradients are normalized by dividing by their mean magnitude and combined into a single vector t. The appearance vectors from the set of examples are used to compute the mean appearance vector $\bar{t}$ and the covariance matrix $S_t$ for each feature point. The Mahalanobis distance is used to measure the similarity of a texture (t) to the model, i.e., $$f(t) = (t-\bar{t})^T S_t (t-\bar{t})$$

A model of the global shape of the features is created from a principal components analysis of the annotated examples. The feature locations of the examples are aligned and arranged into 1-dimensional coordinate vectors. An ordered list of the most significant axes of shape variation is given by the unit eigenvectors $v_k$ such that $$S v_k = \lambda_k v_k$$

where S is the covariance matrix for the coordinate vectors and $\lambda_k$ is the kth eigenvalue and $\lambda_k \geq \lambda_{k+1}$. The eigenvalues indicate the variance of the examples along the corresponding eigenvector. The majority of the shape variation can typically be explained with relatively few of the primary axes. A convenient simplification is retaining only the M most significant axes that encapsulate 99% of the shape variation. The final model includes the mean shape ($\bar{x}$), the primary axes ($v_k$), and their expected ranges ($\sqrt{\lambda_k}$).

The shape model constrains the results of the local searches to positions that form a plausible global shape. The current feature locations are aligned with the mean shape and projected into the principal components subspace using the equation:

$$b = V^T (x - \bar{x})$$

wherein V is the matrix of the first M eigenvectors and b is a vector of shape coefficients for the primary axes. The shape coefficients are then limited to a multiple of their expected ranges and the transformations are inverted.

The ASM can have the reference object and the target object grouped together or can be limited to only the target object. It is necessary to provide, manually or automatically, the spatial coordinates of at least two nodes, in order to provide the initial position and size for the active shape model.

Figure 3A:
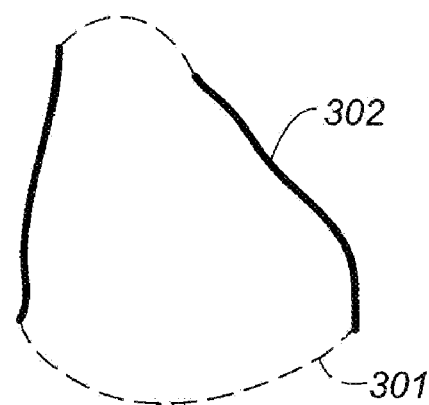
FIGS. 3A and 3B are diagrammatical illustrations of two active shape models which can be employed by the method of the present invention.
Figure 3B:
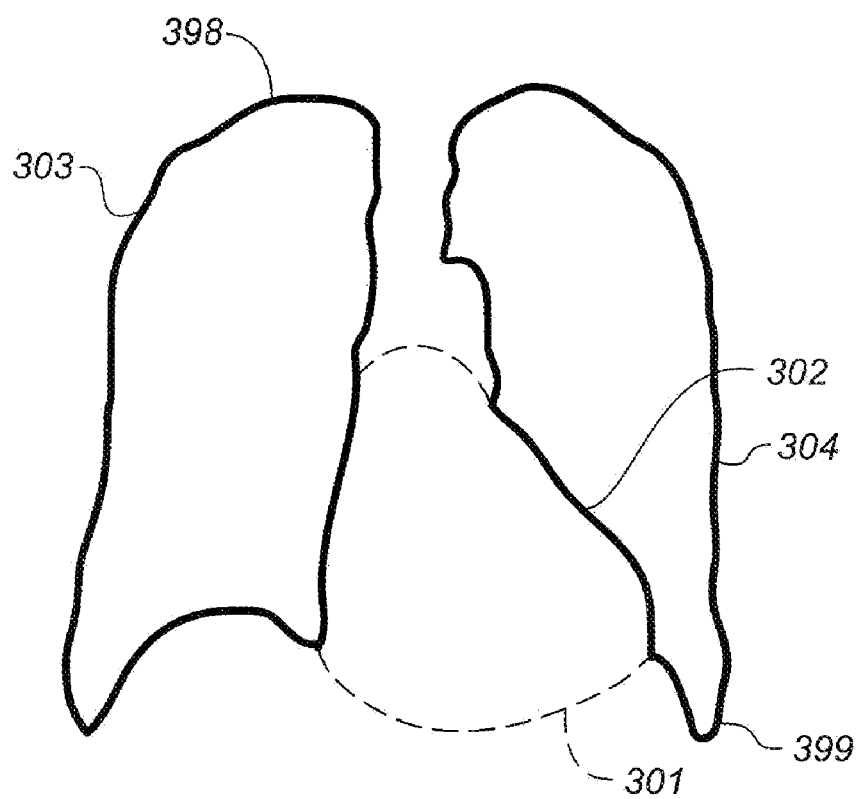

Referring now to FIGS. 3A and 3B, there is shown diagrammatical illustrations of two active shape models which can be employed by the method of the present invention.

FIG. 3A shows an embodiment of the ASM model for the human heart. Solid line segments (302) indicate typical visible portion of the heart boundary. These segments are located through first segmenting the reference object, in this case, the left and right lung fields (303 and 304). In this case, the relative position and the relative size of the target object with respect to the reference object would need to be specified explicitly, for example, by using heuristic rules.

Alternatively, referring to FIG. 3B, both the target (heart, the sum of 301 and 302) and the references (lung fields, 303 and 304) are combined in a joint ASM. Note that the boundaries of both the left and right are visible (therefore indicated by solid lines).

This ASM is typically initialized by the corners of the lung fields (e.g., the tip (i.e., upper portion) of the right lung (398) and the sharp lower corner of the left lung (399). In this situation, the relationship between the target object and the reference object is implicitly accounted for by the combined model. As a result, both heart and lung fields are segmented in one stage, as opposed to two stages needed by the first model that contains only the heart.

Figure 4:
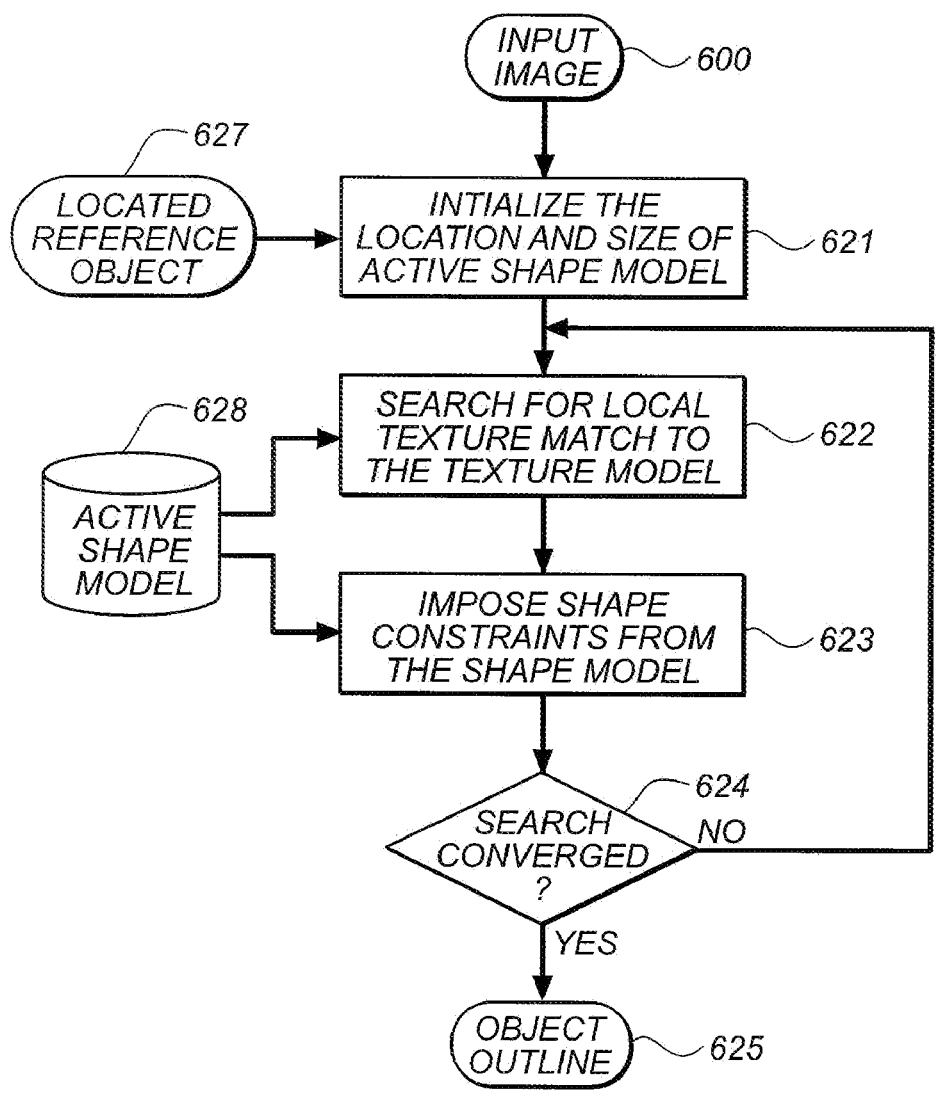
FIG. 4 is a block diagram illustrating the steps of applying a trained object model on a new image.

FIG. 4 is a block diagram illustrating the steps of applying a trained object model on a new image.

Using the first model (i.e., heart only) and after the reference object (i.e., lung fields) has been segmented, the input image (step 600) is accessed and the ASM is initialized (step 621) in the preferred embodiment by aligning the mean position of the nodes in the training examples (as will be more particularly described below with reference to FIGS. 5 and 6) with the location and size of a located reference object (step 627) using the shape nodes that indicate the reference object.

A search process is then performed to find a match between the ASM and local image structures in terms of texture (step 622) and shape (step 623) according to the trained ASM (step 628).

This process repeats until the positions of the nodes converge upon a stable result (step 624). The final outline of the heart is generated (step 625) comprised of the spatial coordinates of the corners ("nodes") of the ASM. (As will be more particularly described below, the local neighborhoods around each node are investigated to find the positions that best matches the texture model. The resulting positions are then constrained to form a plausible shape using the shape model).

It is noted that steps 622 through 625 correspond with step 30 of FIG. 1.

As earlier discussed, if the combined ASM is used instead, the final complete outline of the heart is obtained at the same time as those of the reference lung fields.

An ASM is comprised of nodes. In general, nodes should be placed on the points of large curvature (i.e., corners), on the outline of the object because such corners characterize a shape, as shown in FIGS. 3A and 3B. In addition, it can also be advantageous to place nodes where the contrast between the interior and exterior of the object is expected to be large because that is where the texture characteristics are most separable. The active shape model encodes such texture characteristics as probability distributions (derived from the training stage, as described below).

Figure 5:
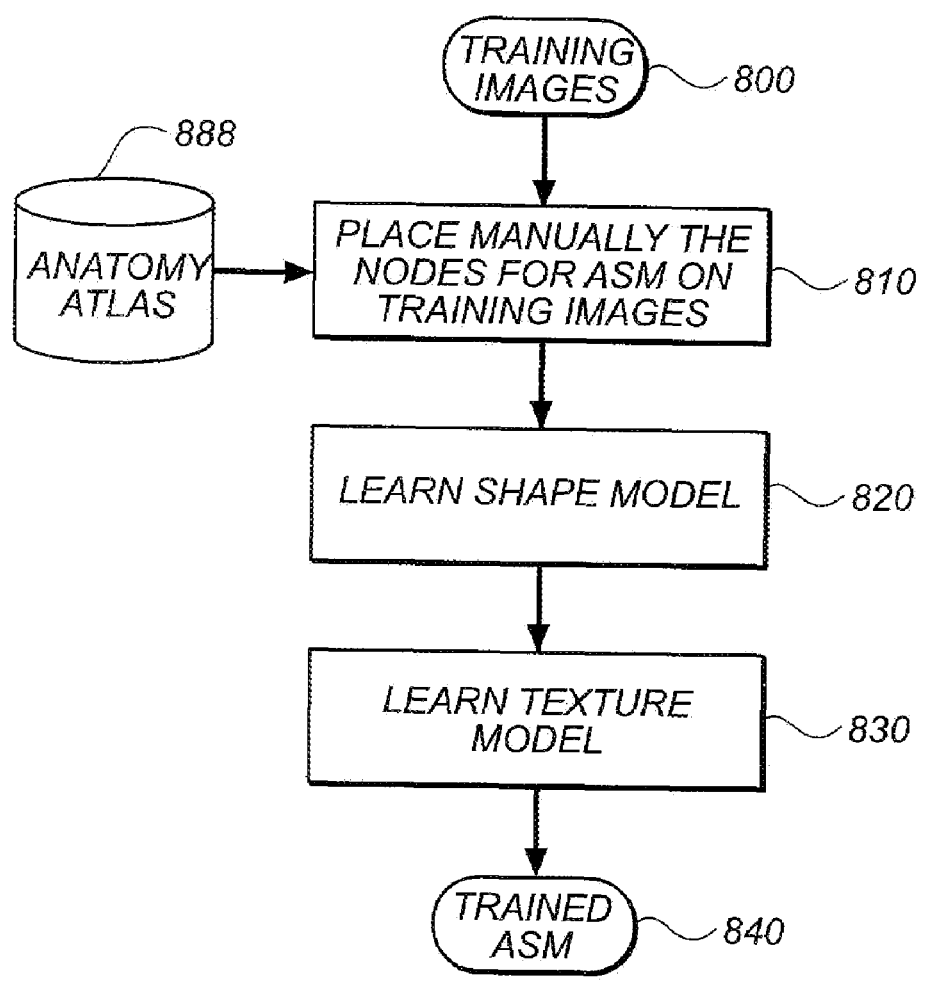
FIG. 5 is a block diagram illustrating steps for training a statistical (not parametric) object model using augmented training examples.

Once the topology of an ASM is determined, the ASM needs to be parameterized through a training procedure illustrated in FIG. 5. FIG. 5 shows a block diagram illustrating steps for training a statistical (not parametric) object model using augmented training examples.

A sufficient number of training images (step 800) need to be collected. In general, the more nodes an ASM is comprised of, the more training images are needed to adequately train the ASM. During the training process, an operator needs to place manually the same nodes defined in the ASM on the targets in the training images (step 810). According to the present invention, additional nodes need to be placed along occluded portions of the target boundary based on the visible portions and a pre-determined atlas (step 888) of the anatomy. In practice, this is performed by an experienced operator who understands the anatomy and is able to extrapolate from the visible portions based on his knowledge of the anatomy. From the training images marked and augmented by the operator, the relative spatial relationships among the nodes are learned to form the shape model (step 820), while at the same time the color variations near the nodes are learned to form the texture model (step 830).

It is preferred to form a multi-resolution texture model by using a series of boxes of different sizes in order to encode texture properties at different scales.

After being presented with various examples, the trained ASM model (step 840) learns to cope with normal variations in terms of texture and shape.

Figure 6:
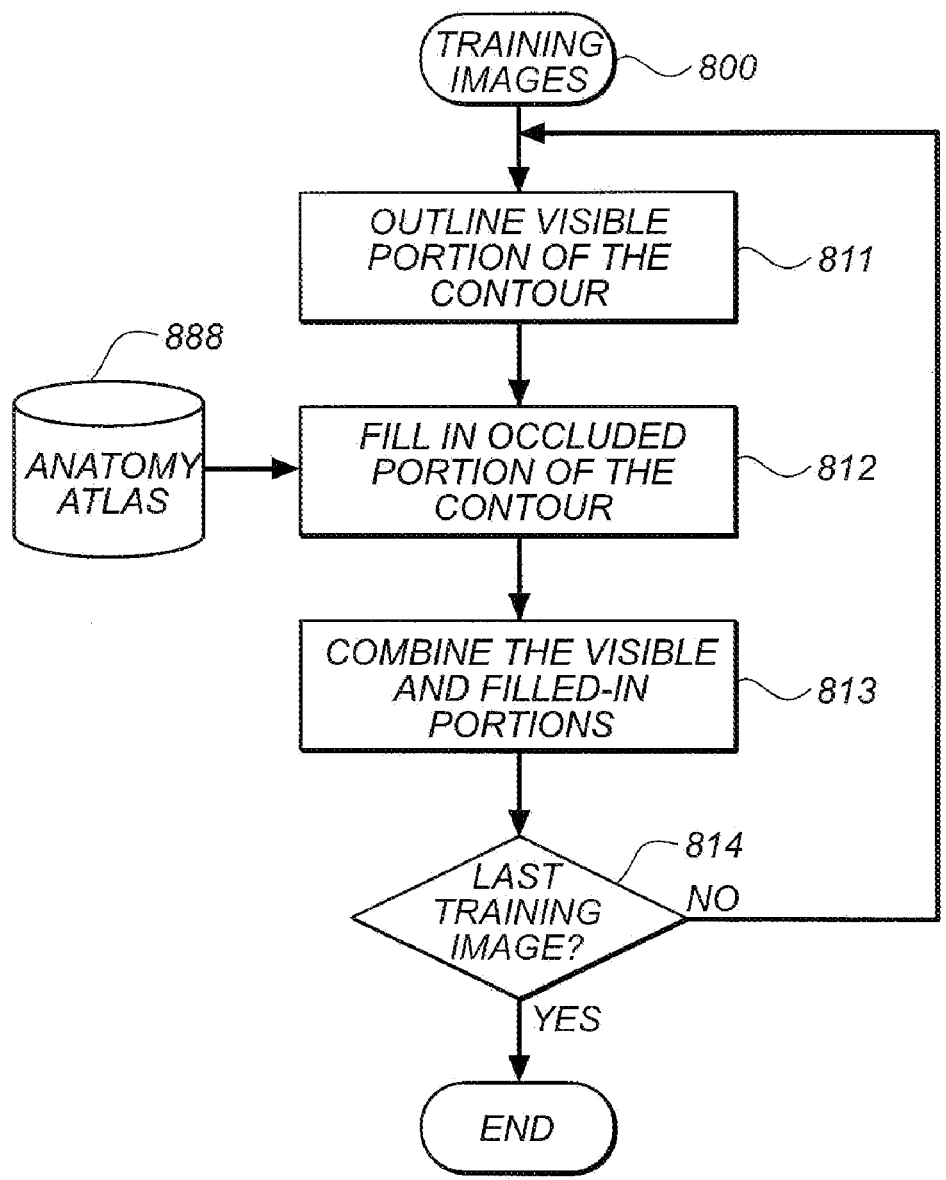
FIG. 6 is a block diagram illustrating the step of placing the nodes for ASM on the training images.

FIG. 6 shows a block diagram illustrating step 810, nodes for ASM are placed on the training images. At step 811, an operator/user outlines visible/unoccluded portions of the anatomic structure in an accessed training image (step 800). Next, the operator fills or augments missing/occluded portions (step 812) of the anatomical structure according to a pre-determined anatomy atlas (step 888) of the structure. Both outlined and augmented portions are combined at step 813 to form an augmented training example. Steps 811-813 are repeated (step 814) for each image in the set of training images to form a collection of augmented training examples.

Alternatively, a shape constrained active contour model, such as described by D. Cremers, T. Kohlberge, and C. Schnorr, "Shape statistics in kernel space for variational image segmentation," Pattern Recognition 36 (2003), pp. 1929-1943, can be used to replace the active contour model. The same augmentation procedure would apply.

Figure 7A:
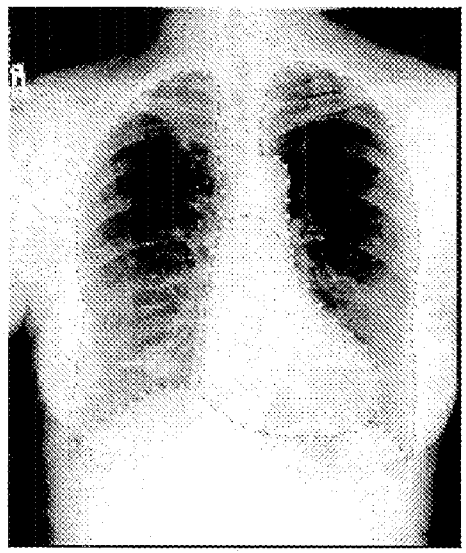
FIGS. 7A and 7B are examples of segmented objects.
Figure 7B:
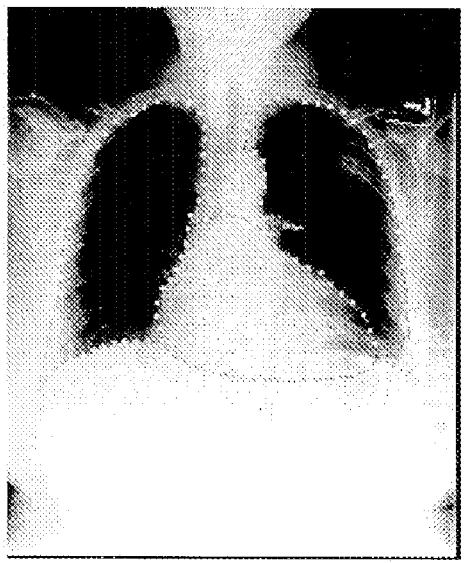

FIGS. 7A and 7B are examples of segmented objects according to the present invention.

Once the heart is accurately segmented from a radiograph, it is known to those skilled in the art to estimate the size of the heart by calculating the area within the segmented contour and applying a proper magnification factor (which can be pre-determined through device calibration).

The present invention may be implemented for example in a computer program product. A computer program product may include one or more storage media, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed is:

1. A method for segmenting an anatomical structure having portions occluded in a digital image, the digital image being produced by a projection-based medical imaging modality, the method comprising the steps of:
    outlining an unoccluded portion of the anatomical structure in a training image;
    augmenting the occluded portion of the anatomical structure according to a pre-determined atlas of the anatomical structure;
    generating an augmented training example using the outlined and augmented portions;
    repeating the steps of outlining, augmenting, and generating for a plurality of training images to train a statistical model of the structure;
    accessing the digital image; and
    segmenting the anatomical structure in the accessed digital image according to the trained statistical model.

2. The method of claim 1, wherein the statistical model is comprised of a shape model and an appearance model.

3. The method of claim 1, wherein the statistical model is an active shape model.

4. The method of claim 1, wherein the statistical model is a shape regularized active contour model.

5. The method of claim 1, further comprising the step of determining a size of the anatomical structure according to an area within the segmented anatomical structure.

6. The method of claim 1, further comprising the step of displaying, printing, or transmitting the segmented anatomical structure.

7. A computer product embodied in a computer readable medium for performing the steps of claim 1.

8. A system for segmenting an anatomical structure having portions occluded in a digital image, the digital image being produced by a projection-based medical imaging modality, the system comprising:

means for accessing the digital image produced by the projection-based medical imaging modality; and a programmable computer having a microprocessor, computer memory, and a computer program stored in the computer memory for performing the steps of:

outlining an unoccluded portion of the anatomical structure in a training image;

augmenting the occluded portion of the anatomical structure according to a pre-determined atlas of the anatomical structure;

generating an augmented training example using the outlined and augmented portions;

repeating the steps of outlining, augmenting, and generating for a plurality of training images to train a statistical model of the structure;

accessing the digital image; and segmenting the anatomical structure in the accessed digital image according to the statistical model.

* * * * *